July 16, 1940.  O. H. BASQUIN  2,207,996
WEIGHING APPARATUS
Filed Oct. 1, 1934  5 Sheets-Sheet 1

Inventor
Olin H. Basquin
By Roland C. Rehm Atty.

July 16, 1940.　　　　O. H. BASQUIN　　　　2,207,996
WEIGHING APPARATUS
Filed Oct. 1, 1934　　　　5 Sheets-Sheet 2

Inventor
Olin H. Basquin
By Roland C. Rehm Atty.

July 16, 1940.   O. H. BASQUIN   2,207,996
WEIGHING APPARATUS
Filed Oct. 1, 1934   5 Sheets-Sheet 3

Inventor
Olin H. Basquin
By Roland C. Rehm  Atty

July 16, 1940.     O. H. BASQUIN     2,207,996
WEIGHING APPARATUS
Filed Oct. 1, 1934     5 Sheets-Sheet 4

Inventor
Olin H. Basquin
By: Roland C. Rehm Atty.

July 16, 1940.     O. H. BASQUIN     2,207,996
WEIGHING APPARATUS
Filed Oct. 1, 1934     5 Sheets-Sheet 5

Patented July 16, 1940

2,207,996

UNITED STATES PATENT OFFICE 2,207,996

WEIGHING APPARATUS

Olin H. Basquin, Evanston, Ill., assignor to Streeter-Amet Company, Chicago, Ill., a corporation of Illinois Application October 1, 1934, Serial No. 746,310

21 Claims. (Cl. 265—5)

This invention relates to scales and among other objects aims to provide an improved scale capable of being brought rapidly to balance or load indicating position.

The invention may be readily understood by reference to one illustrative embodiment thereof shown in the accompanying drawings.

To facilitate illustration, conventional and obvious structural features have been omitted and the figures of the drawings reduced substantially to diagrammatic simplicity. In said drawings.

While a rapidly operating scale is advantageous for many purposes now served by other scales, it is indispensable if the weighing time be substantially limited. For example, in so-called motion weighing, e. g., weighing cars in a moving train or individual loads on a moving conveyor, etc., it has heretofore been impossible to obtain accurate individual recorded weights of the successive loads as they pass across the scale if the free weighing time has been less than two and one half to three seconds. The free weighing time is substantially less than the interval between loads since the time consumed in moving one load off the scale and another one on must be excluded from the free weighing time. The latter is the period during which a specific load remains wholly and alone on the scale. Where the rate of motion of the moving loads, as in a train of cars, can be varied, such rate may be reduced to conform to the limitations of a particular scale, but in many instances the rate of motion is determined by other factors and cannot be reduced to bring it within the limitations of existing scales. In such instances it has heretofore been impossible accurately to weigh the moving loads individually.

The time characteristic of a scale may be defined as the time interval required for the scale to come to balance, or to its load indicating position after application of the load. In recording scales, if variation of the load in the interval between load balance and the operation of the recording mechanism would result in a false record, then such interval must be included in the time characteristic or free weighing time of the scale.

In the common forms of scales, the load is counterbalanced by a spring or a pendulum, and if unrestrained, the system would oscillate with a motion that is nearly simple harmonic. Damping means such as a dash-pot are generally employed to reduce the amplitude and duration of oscillation and thereby to bring the scale to equilibrium as rapidly as practicable; but regardless of care in design, the inherent limitations imposed by the necessity for accuracy have made it impossible to bring the scale to balance sufficiently rapidly to permit its use for many types of rapid weighing.

In the present embodiment of the invention, the weighing time is reduced by (1) using a system whose period of free vibration is short, (2) allowing the system to have a limited number of swings of which the duration of each is preferably slightly smaller than the quarter period, and (3) bringing the system to rest after each of these swings through the application of periodically applied frictional resistance. During the intervals between restraint, the system may move with much greater speed and freedom than when restrained by the conventional dash-pot. Dash-pots or other damping means if used at all, are incidental and for the purpose of minimizing the effects of vibration. Preferably the frequency of application of restraint to movement is determined by the period of oscillation of the system, that being substantially constant regardless of the load on the scale; and the release from restraint and its reapplication are so adjusted that duration of each swing is preferably somewhat less than the quarter period, and at each application the restraint is continued until the system has come to rest. In a freely oscillating system, the load indicating member swings equal amounts (the amplitude of oscillation) on opposite sides of the center of movement, i. e., the load balance position, and reaches such position at the quarter period following its release from restraint. Therefore restraint applied to the system at the quarter period tends to arrest the load indicating member in load balance position. It it is not however practical to check movement too abruptly at such time because, among other reasons, of the resulting shock (this being the instant of most rapid movement of the oscillating system). The stopping is therefore made as abrupt as may be without imposing undue stress or shock on the system, and some small movement or slip occurs after the application of restraint. As will presently appear, subsequent release of the system and application of restraint again near the quarter period after release (the period of oscillation being the same regardless of the amplitude of oscillation) will stop the load indicating member substantially at load balance position. Out of abundance of caution a third cycle of restraint may be applied, but the movement of the system would in most cases be zero or in any case not perceptible.

As will also presently appear, the invention is not limited to a specific form of scale and details thereof have therefore been omitted to secure simplification. As here shown, the invention has been embodied in a simple scale in which the counterbalancing force is developed by a helical spring. A rack and pinion driven indicator shaft provides an index of the scale positions. The spring 10 is connected to counterbalance the load through a rocker 11 supported by a pair of flexible steel tapes 12 which wind upon the arc-shaped surfaces 13 as the rocker rises under load. The load is connected to the rocker through a single steel tape 14 connected to the rocker arm at 15 and operating upon the arc-shaped surface 16 which lies between the tapes 12 but is of greater radius than the surfaces 13. The load is connected to tape 14 through a conventional system of scale levers whose details form no part of this invention and therefore are not shown. The function of the scale levers is of course to permit the load to be counterbalanced by relatively small tension in the tape 14. The counterbalancing spring 10 is in the present instance connected to the rocker through a bar 17 operating in a straight line at the opposite end of the rocker tangentially of the arc-shaped surfaces 18 and to which it is connected by a pair of tapes 19 which wind and unwind on the surfaces 18. The ends of the tapes are connected at 20 to the bar and at 21 to the rocker. Upon the application of a load to the scale and an increase in tension in the tape 14, the rocker is bodily rotated and at the same time rises by rolling up tapes 12 until the increased spring tension counterbalances the load.

The indicator shaft 22 carries a pinion 23 which is operated by a straight rack 24, the latter being practically an extension of bar 17. The operation of bar 17 is preferably made positive by the addition of tape 25 connected to the bar at 26 and to the rocker at 27 and lying between the tapes 19 and winding upon an intermediate portion of arc-shaped surface 18. In the present instance the design of the spring is such as to involve an increase in tension in the load tape of about sixty-five pounds from zero load to full load. The zero load tension in present instance is about twenty-five pounds, of which about fifteen pounds is needed to balance the system, and the remainder is used to insure positive response at small loads. The full load tension is therefore about ninety pounds.

In the absence of restraint, the application of a load to the scale will bring about an oscillation of the system including an oscillation of the indicator shaft which would continue for a substantial period of time if not damped out. The oscillation would be simple harmonic in character and would have equal displacement or amplitudes on opposite sides of the balance point, i. e., the point at which the system eventually comes to rest. It will be understood of course that the period of the oscillations remains substantially constant regardless of the continuously decreasing amplitudes of oscillation. The period of oscillation (i. e., the time required for the system to swing to and fro) obviously depends upon the moment of inertia of the system but in general will be substantially less than one second; in the present instance, the period is not far from seven-tenths second.

It has been customary in many types of scales to connect a continuously acting dash-pot or equivalent damping device to the system to minimize the time consumed by oscillations, but because of the inherent limitations of the types of dash-pots available for use on scales where accuracy is, of course, important, it has not been possible in most high grade scales, and particularly those of high capacity, to bring the scale to balance or load indicating position in a sufficiently short time to adapt the scale for rapid weighing.

In the present scale, the continuous damping action of the conventional dash-pot or other checking apparatus has been supplanted by a periodically applied checking or restraining force whose application is preferably synchronized with a predetermined phase of the cycle of oscillation of the system in order abruptly to reduce the speed, and after a small number of such applications to bring the system to rest very close to the position of equilibrium. One illustrative device for developing the aforesaid periodic force is here embodied in what may be termed for convenience, a brake or grabbing device 28 which is periodically applied to the system and here shown arranged to check the motion of the system by engaging bar 17 which in this instance oscillates longitudinally in a straight line. The brake is in this instance mechanically operated. Normally the brake is in holding engagement with the bar 17 to hold the system at rest and thereby protect it from violent movements such as might occur upon the sudden application or removal of a load. The period during which the bar is released is advantageously approximately that of a quarter of the period of the system. Thus after the system has been released, it is again checked approximately at the center of motion which would be approximately at the balance point.

As above noted, the period of oscillation of the system does not substantially vary for different loads since the latter (owing to the very great multiplication of the system of scale levers and the consequent imperceptible movement of the load) produces very little change in the moment of inertia of the system, upon which the period of oscillation depends. A heavy load will of course produce initially a much greater amplitude of oscillation of the system than a smaller load but the period of oscillation will be substantially the same for the light and heavy loads. In each instance the center of oscillation would be respectively the balance point for the respective loads.

With the checking of oscillation by the brake at a quarter period after release (when the system is approximately at its center of motion), the amplitude of oscillation ensuing upon the subsequent release of the system is of course extremely small, being only the amount which the system is displaced from the balance point. A second checking by the brake at the quarter period stops the system substantially at the balance point. While a third braking cycle is desirable simply as a factor of safety as regards accuracy, the accuracy obtained by two cycles of checking in a well adjusted system would be within the allowable government tolerances. The movement of the system occurring during the third braking cycle is usually not preceptible. It has been found satisfactory, thus far, to leave the brake applied to the system for about one-twelfth of the period after each of its first two applications in the above described process of bringing the system to its balance position. Since the time consumed in each release and subsequent checking of the system is only about one-third of the period of the system, the time consumed in three checking operations would be approximately equal to the period, say three-quarters of a second. In other words, by the use of a periodically applied checking force the scale may be brought to load balance position within three-quarters of a second after the application of a load and release of the system by the brake.

The brake or checking device 28 is here shown as consisting of pivoted jaws 29 which are normally held by springs 30 in clamping relation to the bar 17 which operates between them. Jaw operating arms 31 project from the opposite side of the jaw pivot 32 and are actuated by a rotating cam 33 which periodically passes between the cam rollers 34 to separate the arms 31 and open the jaws to release bar 17. A stationary centering fixture 35 projects between the jaw operating arms to prevent the bodily shifting of the braking device with reference to the bar 17 and to insure the simultaneous engagement of the bar by the jaws and uniformity in the braking or checking action of the jaws.

As here shown, the brake operating cam 33 is rotary in character, being mounted on shaft 36, and is designed to effect a complete cycle of operation of the braking device, i. e., release and subsequent engagement of the bar 17, upon each revolution of the cam. For that purpose a portion of the margin of the cam which operates the arms 31 is interrupted as at 37 to allow the jaws to close and clamp bar 17 during the interval when the rollers 34 occupy such interrupted portion. The cam is here shown operating in a counter-clockwise direction (Fig. 1) and the entering or leading portion of the margin is double beveled as at 38 to permit it to pass between and separate rollers 34. The interval of release of bar 17 is represented by the remaining portion of the periphery of the cam, in this instance about 270° of the periphery of the cam. The length of this portion of the cam together with its rate of movement determines the interval during which the scale system is allowed to oscillate and is in the present case adjusted to be substantially the equivalent to one-quarter of the period of oscillation.

To secure uniformity in the operation of the cam, the latter is preferably driven by a synchronous motor 39. The frequency of commercial alternating current is now so carefully regulated as to make the synchronous motor a reliable means for effecting uniform operation. Preferably a fly wheel 40 is provided to minimize incidental variations in the rate of rotation. The motor is here shown equipped with a built-in speed reducing device 41 by which motor speed is reduced to the desired speed of cam shaft 36. It will be understood that in practical design the accurate adjustment of the operation of the braking device to the period of oscillation of scale system is effected by the design of cam 33. The speed reduction effected in the reducer 41 need therefore be only approximate.

Figure 3:
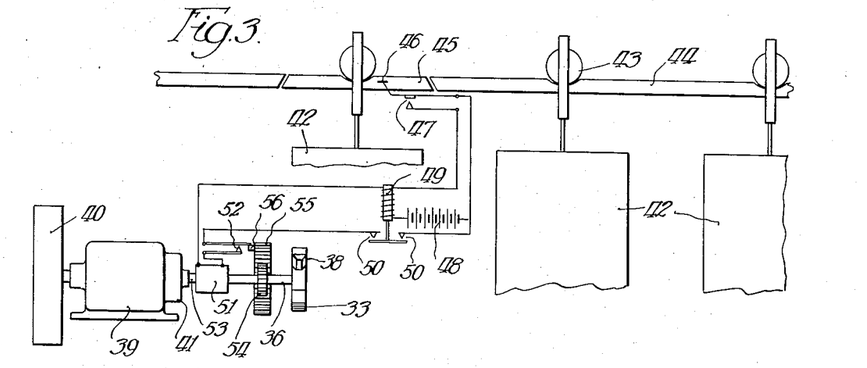
Fig. 3 is a diagrammatic view illustrating the rapid successive application of loads to the scale and the actuation of the weighing mechanism by such loads.

The operation of the scale braking device may advantageously be initially controlled by the application of loads to the scale. In Fig. 3 is illustrated diagrammatically one form of such arrangement. The scale is here shown embodied in a conveyor system which involves rapid weighing since it is essential that the loads be weighed as rapidly as they are presented by the conveyor. The loads 42 are supported by roller brackets 43 on the conveyor rail 44. The means for continuously moving the loads along the rail is conventional and need not therefore be illustrated. A free section 45 of the rail represents the scale platform. When a load comes on the scale the roller of the bracket depresses a switch member 46 closing an electric circuit at contacts 47 which are in series with a source of electric power 48 and a solenoid switch 49. The latter switch when closed on contacts 50 completes another circuit through the source of power, solenoid 49, a magnetic clutch 51, and a normally closed switch 52. The magnetic clutch operatively connects the motor driven shaft 53 with shaft 36. A clutch of this character may be obtained on the open market and its details form no part of the present invention. The second-named circuit remains closed regardless of the opening of contacts 47, which occurs after the roller passes beyond the member 47. The contacts 47 remain closed merely long enough to establish the second circuit through solenoid switch 49. Until broken, the latter circuit causes the continuous rotation of cam 33 and the periodic actuation of the braking device. As previously suggested, means are provided for effecting three cycles of the braking device as being amply sufficient to bring the scale to load balance position. For this purpose the switch 52 is actuated momentarily only at every third rotation of shaft 36. The operating mechanism is here represented by a pair of gears 54 and 55, the latter being three times the size of the former and being rotated thereby once in every three revolutions of shaft 36. A switch operating member 56 is carried by the gear and momentarily opens switch 52 on each revolution (i. e., each three revolutions of shaft 36). The switch 52 again closes regardless of how little movement of the system occurs after the breaking of this circuit. Opening of switch 52 breaks the circuit and allows solenoid switch 49 to fall, thus breaking the circuit at points 50. The circuit is then not reestablished until the subsequent closing of contacts 47 by the succeeding load. Although the system coasts very little, it is generally desirable to have the magnetic clutch 51 so arranged as to apply a brake to shaft 36 when the above circuit is open. It is important to note that the switch operating device 56 is located on gear 55 at such a point as to bring the cam 33 to rest while the braking device 28 is in clamping engagement with bar 17, i. e., when cam 33 is out of engagement with rollers 34, as in Fig. 1. While rollers 34 occupy any portion of the interrupted margin, the braking device will of course be left engaged.

Figures 1, 2:
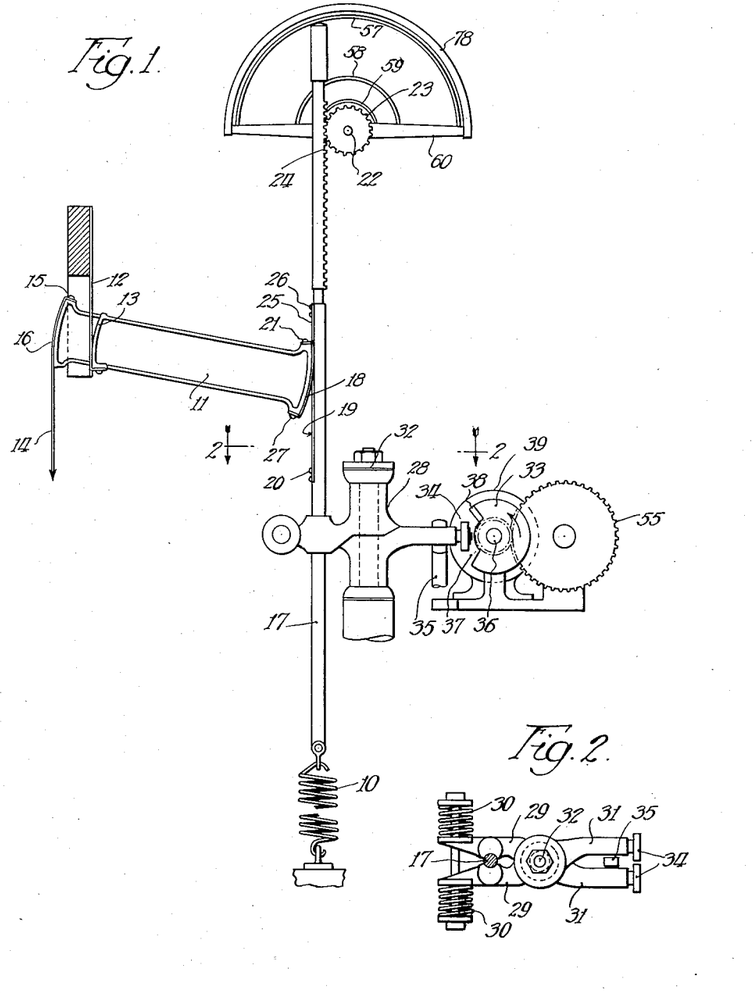
Fig. 1 is a diagrammatic representation of a spring scale mechanism and apparatus for bringing the scale quickly to equilibrium, the details of the conventional system of scale levers having been omitted.
Fig. 2 is a plan view taken from the plane 2—2 of Fig. 1 showing the brake or checking device.

It will also be understood that scale platform 45 is connected by an appropriate and conventional system of scale levers with the tape 14 (Fig. 1). The details of the scale platform of course vary with the particular weighing problem as also do the means by which the successive loads are applied to the scale platform, the conveyor here shown merely representing one instance involving rapid weighing.

To avoid undue shocks to the system, it is preferable that the brake allow the system to slip slightly during its application. The amount of slip allowed will of course depend largely on the moment of inertia of the system. The heavier systems which would sustain greater shock by a sudden arrest of movement, may be allowed a greater degree of slip than a lighter system.

Figures 4, 5, 6, 7:
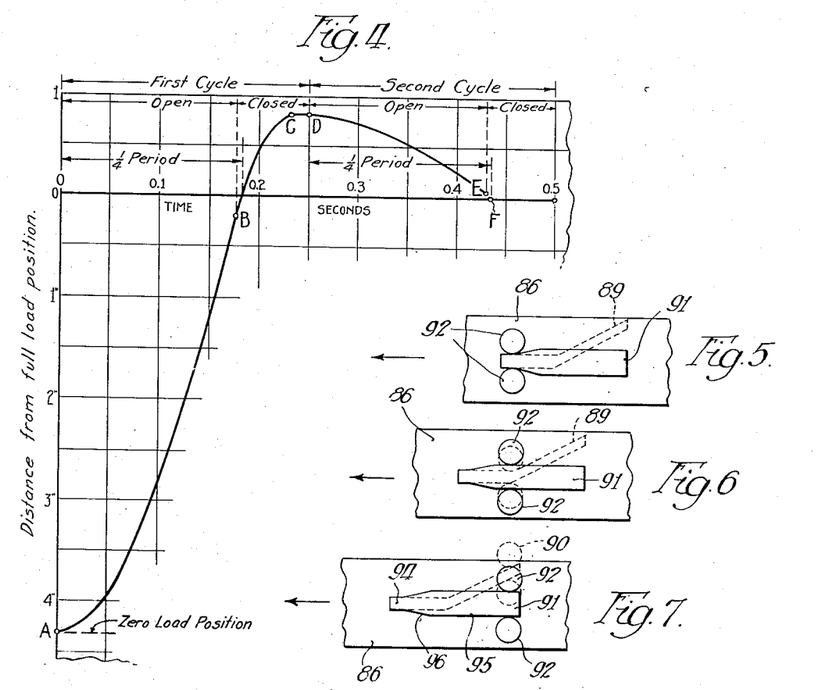
Fig. 4 is a chart illustrating the effect of the periodic application of restraint to the oscillating scale system.
Figs. 5, 6 and 7 are fragmentary plan views of successive positions of the step cam actuating mechanism.

In Fig. 4 is illustrated approximately what takes place in a system having a period of oscillation of about seven-tenths of a second, when a full load is applied and the system released from zero load position, represented by the point A. The diagram shows a time position curve; abscissas represent time after the release of the system in seconds while ordinates represent the vertical distance of an arbitrary point from its position of equilibrium for the full load present. Between points A and B the system is allowed to swing freely, as indicated by the word "open" which relates to the brake 28. Preferably just prior to the expiration of the quarter period and when the system is approximately but not quite at balance position, the brake is actuated to check movement. Such checking commences at the point B of the curve; and the curve from B to C represents the slipping action of the system until it is brought to rest. The displacement of the point C above the line corresponding to load balance position represents the amount which the system has slipped or moved beyond true load balance position. At the point D the brake again releases the system, which being beyond the load balance position resumes oscillation in the return or reverse direction; and just prior to the expiration of the second quarter period, at the point E, the brake again restrains the system which because of its much lower momentum slips only slightly to the point F which is substantially at zero displacement or load balance position. Subsequent operations of the brake generally result in no perceptible movement of the system since it already is in equilibrium at the load balance position. As indicated in Fig. 4, the time consumed for two complete braking cycles is only slightly greater than four-tenths of a second.

It is not necessary of course that the system be released at zero load position or the point of maximum displacement. It may be released in any position, and in practice, it is released from the position determined by the previous load which may be only slightly displaced from that for the new load. The extent of difference in weight between the previous load and the next load determines the initial amplitude of oscillation. If the subsequent load exceed the previous load, the first swing for this second load will be toward larger scale readings. If the subsequent load were exactly the same weight as the previous load, there would obviously be no oscillation. The chart of Fig. 4 represents the extreme condition as regards amplitude of oscillation. For that reason the operation of the brake precedes the passing of the full load position by only a very small amount. Under ordinary or practical operation, the operation of the brake in advance of load balance position would be just about sufficient to compensate for the slipping of the system in the brake and thus arrest the system very close to the balance point and insure practically zero displacement upon the subsequent operation of the brake.

The illustrative scale may advantageously be equipped with weight recording apparatus capable of recording and/or totalizing successive weights, and the time which is required for the operation of this supplementary apparatus may not decrease the number of weighings that can be done per minute. The recording apparatus is advantageously adapted to operate during the interval between the removal of one weight and the application of another. In the present instance the position of the indicator shaft 22 is utilized to set or determine the setting of, the recording apparatus, the indicator shaft being held by the brake in a fixed position during the interval of removal and application of successive weights. The recording apparatus is here typified by a series of step cams 57, 58 and 59 representing respectively the units, tens and hundreds digits in the weight, and an index blade 60. Except for the very light index blade or arm 60 which is mounted on the indicator shaft, none of the parts comprising the recording apparatus rotate with or are moved by the indicator shaft on the scale mechanism. Thus the inertia and sensitiveness of the apparatus is not substantially increased by its association with recording apparatus. The index blade need not have a substantially greater mass than the ordinary indicator pointer, and indeed may be substituted for the pointer.

The scale here shown is designed for weighing up to nine hundred ninety-nine units, i. e., not exceeding three digits. The indicator arm 60 carries a plurality of sets of double step cam setting fingers 61, 62, 63, 64, 65 and 66 for setting respectively the units, tens and hundreds step cams. The unit or more properly the minimum increment in recorded weight may of course vary considerably depending upon the character of commodities weighed. For light weight commodities the increment will generally be one pound and the scale will weigh by pounds to nine hundred ninety-nine pounds. For heavier loads, the increments of the scale may well be ten or as much as fifty pounds. The use of a double set of fingers facilitates balancing the shaft and reduces by fifty per cent the number of steps required. It will be understood that for any single record only one set of fingers is in use. It will be noted that the hundreds cam has only five steps and that the corresponding fingers are of different length, one of them being in use for loads from "0" to "499" and the other from "500" to "999."

In effecting a record of the weight determined by the position of the indicator arm 60, the step cams are advanced into contact with their respective setting fingers and the amount of the advance serves as an index of the respective units, tens and hundreds digits in the scale reading. In this advancement of the step cams, all cams move parallel to the axis; the units cam has no rotation; the other cams are rotated slightly depending upon the reading, which is explained later. Having the step cams advance rather than the fingers enables records to be obtained without materially increasing the moment of inertia of the weighing system.

Figures 11, 12, 13:
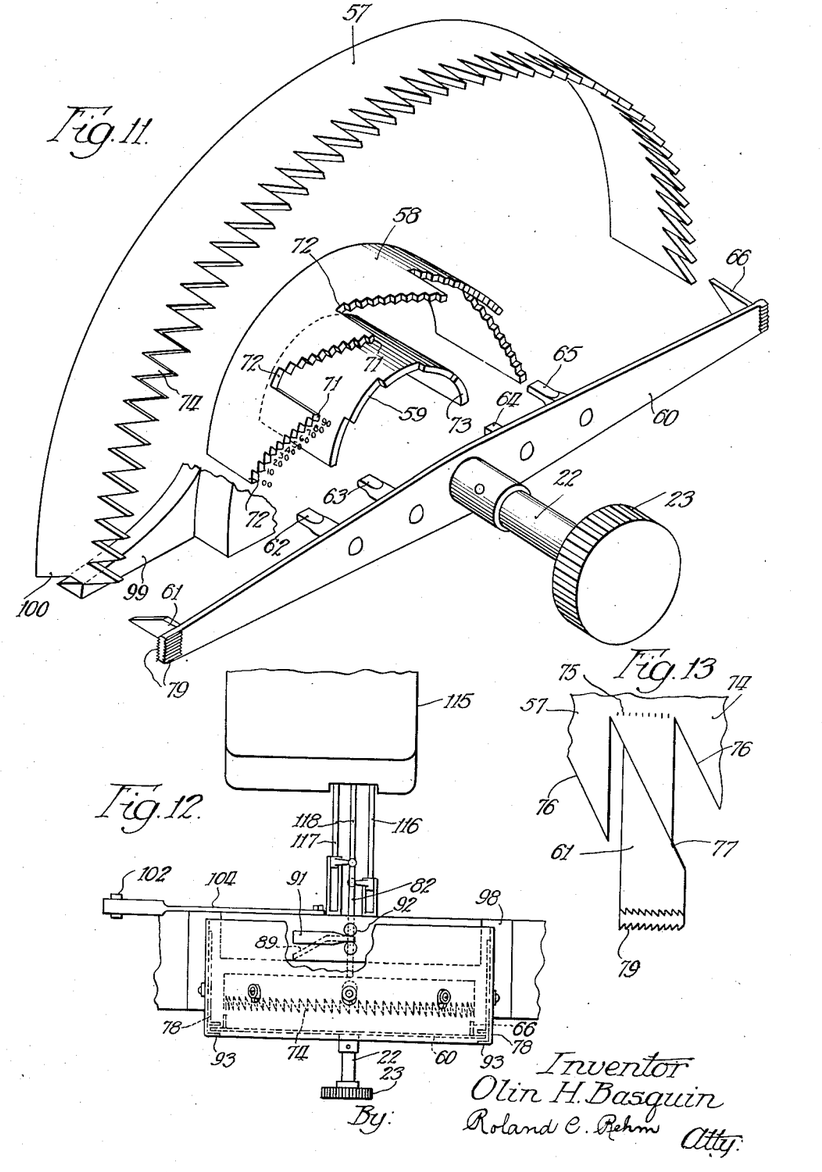
Fig. 11 is a perspective view of the step cams and indicating pointer, with most of the supporting structure removed to facilitate illustration.
Fig. 12 is a plan view showing portions of the step cam actuating and recording mechanisms.
Fig. 13 is an enlarged view of details of the units step cam and index.

Under the present arrangement wherein the entire capacity of the scale is represented by a single revolution of the indicating arm 60, the tens cam is provided with five sets of ten steps, each set corresponding to a step on the hundreds cam. As shown in Fig. 11, the bottom step 72 of each series of steps in the tens cam is wider than the normal step, while the top step 71 is narrower than the normal step; the difference in each case is equal to the thickness of the finger 62. The maximum displacement the finger can have and still strike the bottom step 72 is evidently equal to the excess of bottom step width over finger width, while the maximum displacement of the finger for the top step is the sum of step width and finger thickness; their evident relations explain the noted adjustment in top and bottom step widths for the tens cam. In the hundreds cam the top step 73 is narrow, but there is no wide step because of lack of conditions which make such extra width necessary.

Figure 9:
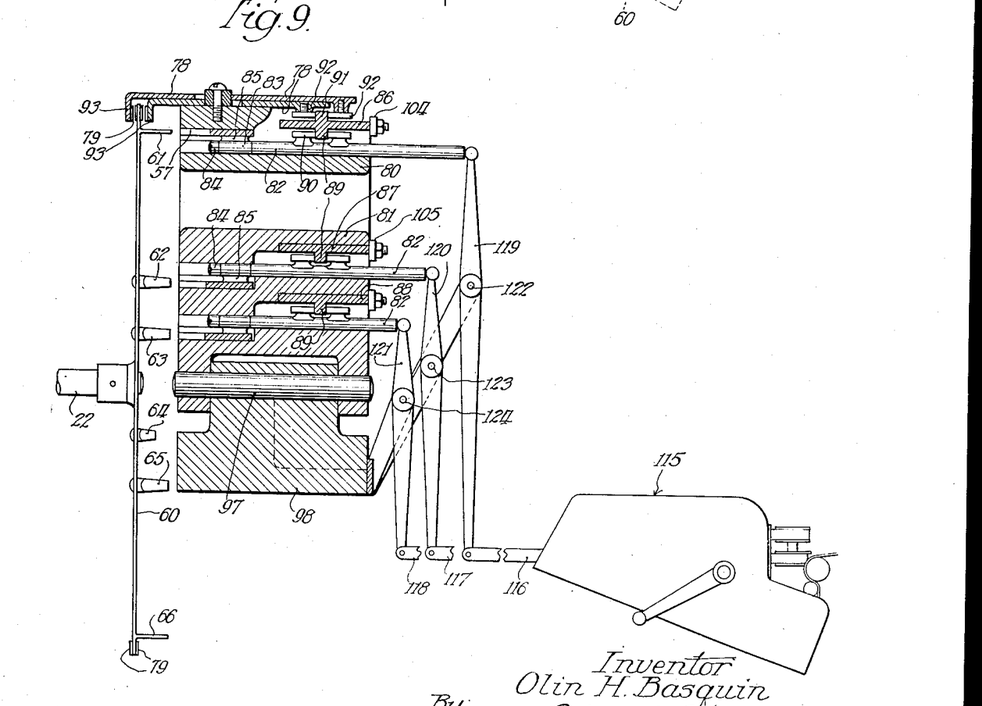
Fig. 9 is a sectional view taken on the plane 9—9 of Fig. 8, showing the step cam actuating and recording mechanisms.

The units cam is shown as a series of wedge-shaped teeth 74, each tooth representing ten units. As shown in Fig. 13, the small (imaginary) circumferential subdivisions indicated at 75 each representing a unit, when projected on the inclined face 76 of the elongated teeth, are substantially multiplied into subdivisions 77 (also imaginary). As illustrated in Fig. 13, the elongated inclined face 76 of a tooth 74 therefore represents ten units. The units fingers 61 and 66 on the indicator arm are given a shape complementary to that of the teeth 74. It will be understood that, as with the hundreds fingers 63 and 64, the units fingers 61 and 66 do not both function for a given reading. As here shown (Fig. 13), the forward advance of the units step cam 57 is determined by the position of the units finger 61 on the indicator arm. Thus, as shown in Fig. 13, the step cam advances until arrested by finger 61 at a point corresponding with units "2" and the forward advance of the step cam therefore represents a units "2" reading. To prevent slight displacement or distortion of the indicator arm by the wedging action exerted by the step cam on the finger 61 (or 66) the indicator arm is held in weight indicating position by a pair of oppositely acting semicircular clamping devices 78 (Fig. 9). Just before the units step cam is advanced, the clamping devices are actuated to grip the index arm to hold it against displacement. Preferably the engaging faces of index and clamping devices are provided with series of small teeth 79 which are adapted to mesh to lock the index arm and positively prevent any movement thereof or of the tooth 61 under the wedging action of step cam 57. The teeth 79 are advantageously so located relative to the units positions as to cause the indicator arm to be moved and locked only in position to indicate whole units. Thus fractional indications are avoided. The teeth 79 are advantage-ously given a saw-tooth contour, i. e., a contour in which one face of each tooth is parallel with the direction of movement of the clamping devices, i. e., perpendicular to the plane of rotation of the index arm. This results in an adjustment of the index arm for all fractional positions, to the next lower unit reading. It should be understood that the angular pitch of the teeth should preferably correspond with the imaginary units subdivisions 75, in this case being about 0.36 degree for an apparatus having one thousand units per revolution of the index arm.

Figure 8:
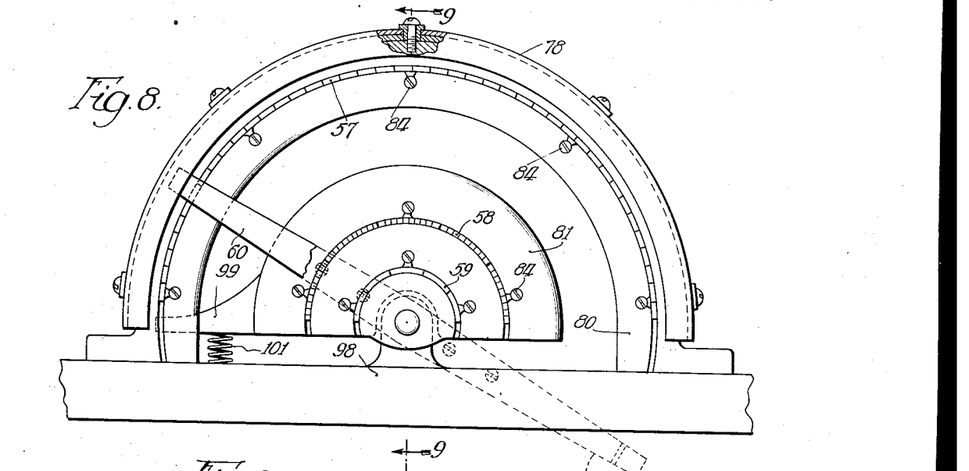
Fig. 8 is a front elevation of the step cam mechanism employed in connection with the recording mechanism.
Figure 10:
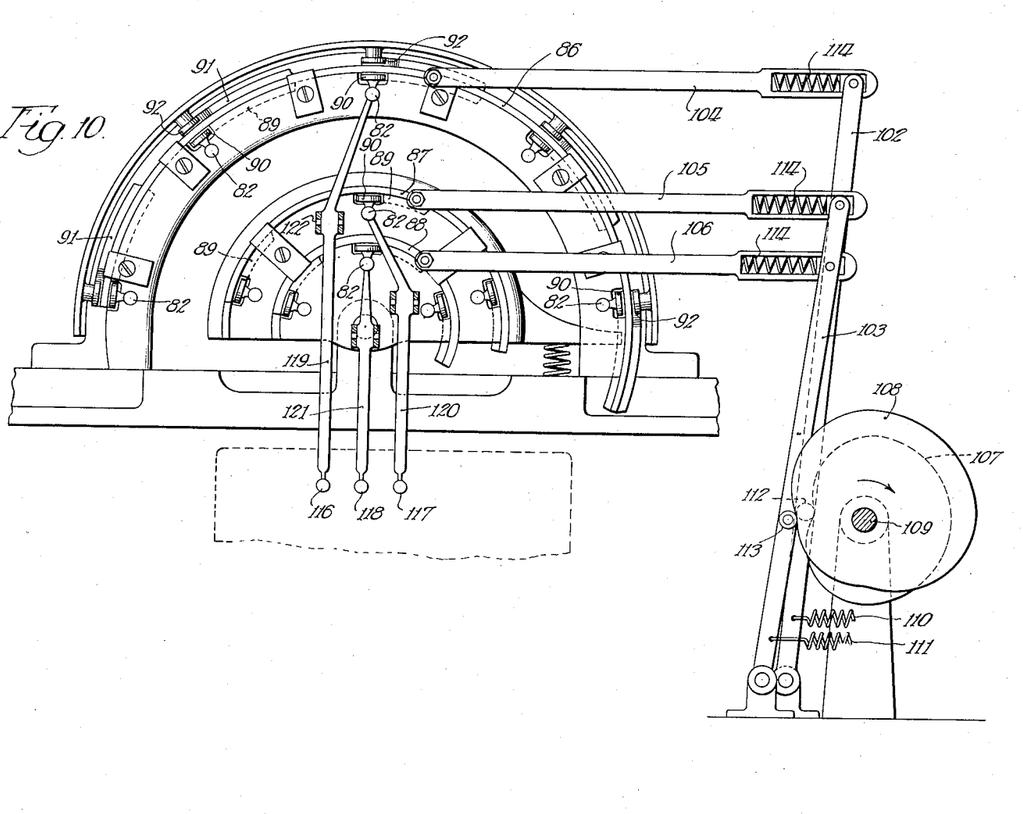
Fig. 10 is a rear view of the apparatus illustrated in Fig. 8 showing portions of the step cam actuating and recording mechanisms.

As shown in Figs. 8, 9 and 10, the semicircular step cams 57, 58 and 59 are advantageously supported in semi-circular shaped housings 80 and 81 and are advanced and retracted by guide rods 82. The latter are connected to the respective cams by sleeves 83 through which reduced threaded extremities of the rods pass. Cap nuts 84 screwed to the threaded ends of the rods complete the connection. The sleeves are brazed or otherwise appropriately attached as at 85 to the respective cams. In the present instance housings 80 and 81 are independent so that the latter may have relative movement for purposes presently described.

Step cam actuating mechanism is here shown in the form of a series of oscillating cams 86, 87 and 88 located at the rear portions of housings 80 and 81 and each is provided with cam ribs 89 preferably located at a plurality of points along the cam. The cam ribs operate in each instance between pairs of cam rolls 90 carried on guide rods 82 and lying on opposite sides of the ribs. As shown in Figs. 5, 6, and 7, the cam ribs have portions inclined to the direction of movement of the cam rings which upon longitudinal movement of the respective cams 86, 87 and 88 cause the respective step cams to move forward or back. The units cam 86 is advantageously provided with a clamp actuating cam rib 91 (Fig. 9) adapted to operate the clamping devices 78 by separating the cam rolls 92 carried by the respective clamping devices 78 thereby to cause their extremities 93 to be drawn together to grip the index arm (see Figs. 5, 6 and 7). For this purpose the cam rib 91 is provided with narrower and wider portions 94 and 95 respectively connected by a tapered portion 96 which serves to operate the rolls 92. The wider portion 95 serves to hold the clamping devices in gripping position during the further advance of cam 86.

As shown in Figs. 5, 6 and 7, the cam rib 91 is located relative to units cam rib 89 to cause the clamping devices to grip the index arm before the units step cam 57 is advanced into engagement with the index arm.

To avoid the possibility of an erroneous reading when the indicator arm is in the critical position, i. e., where one of its fingers is in the neighborhood of a "9" or "0" reading, as for example "129" or "130," means are provided to insure the engagement of the proper step of the next higher step cam (in this case the tens step cam) with its setting finger. The possibility of an erroneous positioning of the next higher step cam arises because the degree of movement of the tens cam between for example a reading of "129" and "130" is only one five-hundredths of its length. This represents an angular displacement of only thirty-six hundredths of a degree. The practical impossibility of eliminating lost motion approximating thirty-six hundredths of a degree makes desirable the provision of means for preventing error at critical points. This is effected in the present instance by adjusting the tens step cam (and also in the present instance the hundreds step cam) by an amount corresponding to the position of the units step cam. As here shown (Fig. 9), the housing 81 is rotatably mounted at the axis 97 of the respective step cams, upon a support 98. An arm 99 projects from the housing in position to be engaged by the cam surface 100 on the units step cam. The housing is thus rotated by an amount corresponding to the advance of the units cam and therefore to the units reading. The arrangement is such that the tens index finger will always strike approximately in the middle of a given step for all positions of the units step cam between "0" and "9," thus avoiding the possibility of striking the next lower or higher steps in the critical positions of "9" and "0." A spring 101 serves to restore the housing 81 to neutral position upon retraction of the units cam.

While the hundreds step cam is similarly angularly adjusted along with the tens cam (since it is carried in the same housing), adjustment becomes important only when the tens cam is in the neighborhood of a "9—0" reading, that is, when a corner of a step on the hundreds cam would otherwise be substantially opposite its index finger. Intermediate adjustments of course do no harm. If the capacity of the scale extended to four digits, then obviously relative adjustment would be necessary between the hundreds and thousands step cams.

To insure the aforesaid adjustment of the tens and hundreds cams prior to the advance of the latter, it is desirable that the units cam be first operated. The cam actuating mechanism is here shown in the form of levers 102 and 103, the first operating the units cam and the latter the tens and hundreds step cams. The levers are connected to the cams 86, 87 and 88 by links 104, 105 and 106. The units cam operating lever is actuated in this instance by rotary cam 107 and the tens and hundreds step cam operating lever is actuated by cam 108 mounted coaxially with cam 107 on shaft 109. Springs 110 and 111 serve to hold the lever cam rolls 112 and 113 against their respective cams. Relative or lost motion between the operating mechanism and the step cams is provided by springs 114 carried in slots in links 104, 105 and 106 which allow the levers 102 and 103 to advance the full amount of their travel regardless of the position in which the respective step cams had been arrested by engagement with the index arm fingers.

The cams 107 and 108 are preferably designed and adjusted as to phase so that at the first quarter turn of shaft 109, lever 102 moves forward to clamp the index arm and advance the units step cam. On the second quarter turn, lever 103 advances the tens and hundreds step cams. During the third quarter turn the recording mechanism, presently described, may be actuated; and during the last quarter turn, levers 102 and 103 operate to retract the step cams to neutral position.

The aforesaid recording mechanism is here represented in the form of a conventional adding or totalizing machine 115 of a type which is readily purchasable on the open market and in which the units, tens, and hundreds bars are set not by the usual keys, but by the position of the respective units, tens and hundreds step cams. For that purpose the units, tens and hundreds bars of the adding machine or totalizer are connected by links 116, 117 and 118 respectively so as to be set by the recording position of the step cams. As shown in Fig. 9, the respective guide rods 82 are extended rearwardly and engage levers 119, 120 and 121 connected to the respective links and pivoted respectively at 122, 123 and 124. Thus the position of the units, tens and hundreds bars in the totalizer or adding machine registers the reading of the respective step cams. The relative lever arms of levers 119, 120 and 121 are advantageously adjusted to correspond with the increments of movement of the bars of the totalizer or adding machine. Obviously the adding machine may be operated either manually or by mechanism connected with shaft 109. It is also evident that in place of the totalizer simple type bars may be positioned by levers 119, 120 and 121 from which the weight alone will be printed. Otherwise the printing apparatus usually built in with the adding machine adequately serves to print and record the weight. It is not necessary of course that the speed of the operation of the weighing apparatus be retarded because of the recording device since the latter is intended to operate during the interval when one weight is being removed from and the next placed upon, the scale. This interval is obviously substantial in duration as compared with the interval allowed for the operation of the scale itself and is much more than ample to effect all of the necessary recording operations including the movement of the step cams, operation of the recorder, and withdrawal of the step cams.

Obviously the invention is not limited to the details of the illustrative apparatus since these may be variously modified. Moreover, it is not indispensable that all features of the invention be used conjointly since various features may be used to advantage in different combinations and subcombinations.

Having described my invention, I claim:

1. Weighing apparatus of the character described comprising in combination, an automatic load counterbalancing system adapted to oscillate freely upon the application of a load, a braking device adapted to engage the system and normally hold it against movement, means for operating said brake to release the system to allow it to oscillate freely for one quarter of the period of oscillation, thereby arresting the system substantially at the load balance position, said brake operating means adapted to hold said system against movement during the removal and application of a load and to release the system after application of a load.

2. Weighing apparatus of the character described comprising in combination, an automatic load counterbalancing system adapted to oscillate freely upon the application of a load, a braking device adapted to engage the system and normally hold it against movement, brake controlling means for releasing said braking device for an interval equivalent to one quarter of the period of oscillation, said controlling means being adapted to repeat the braking cycle to arrest oscillation of the system at points successively approaching its load balance position.

3. In weighing apparatus of the character described, the combination comprising oscillating load counterbalancing means adapted to oscillate freely upon the application of a load about load balance position as a center, a periodically operating brake adapted normally to hold the system against movement, and means for releasing said brake after the application of a load and again applying it after an interval substantially equivalent to a quarter period of the oscillation thereby to arrest the system in load balance position.

4. In weighing apparatus of the character described, the combination comprising oscillating load counterbalancing means adapted to oscillate freely upon the application of a load about load balance position as a center, a periodically operating brake adapted normally to hold the system against movement, and means for successively releasing and reapplying said brake, the intervals during which the brake is released being substantially equivalent to one quarter of the period of oscillation whereby the system is successively brought to rest approximately at the load balance position.

5. Weighing apparatus of the character described comprising in combination, an automatic load counterbalancing system adapted to oscillate freely upon the application of a load, a braking device adapted to engage the system and normally hold it against movement, means for operating said brake to release the system to allow it to oscillate freely for approximately one quarter of the period of oscillation, thereby arresting the system substantially at the load balance position, weight recording apparatus for recording the weight of the load represented by the position in which the system was arrested by said brake, and means for operating said recording apparatus in the interval during which the system is held against movement by the brake.

6. Weighing apparatus of the character described comprising in combination a rotary load responsive index adapted to assume a position representing the weight of the load, a plurality of independent cylindrical step cams representing units and higher digits, a tapered finger projecting from said index for setting the units step cam, said units step cam provided with a series of tapered notches corresponding in shape to said tapered finger and having an angular separation corresponding to ten units, means for advancing said units cam into engagement with said tapered finger, the latter arresting the cam upon engagement with a surface of one of said tapered notches, the axial position of arrest of the cam representing the unit digit of the weight of the load.

7. Weighing apparatus of the character described comprising in combination a rotary load responsive index adapted to assume a position representing the weight of the load, a pair of diametrically opposite fingers carried by said index at equal distances from the axis of rotation of said index, a cylindrical step cam movable axially into engagement with one of said fingers, said step cam having only five sets of steps extending throughout a semi-circle and adapted to engage only one of said fingers, said fingers being different in length and adapted together to provide ten separate positions for said step cam.

8. Weighing apparatus of the character described comprising in combination a scale having units recording means including a movable load responsive element adapted to be moved to a position representing the weight of the load and a cooperating recording element movable toward and away from said load responsive element adapted to be set by the position assumed by said load responsive element, one of said elements having a series of small beveled teeth, the length of the series corresponding in length to the path traversed by said load responsive device, said teeth each representing ten units and being long in relation to their pitch and having one face parallel to the direction of movement of said recording element, the other face being elongated and gently inclined to said direction of movement and its length representing ten units, the other element having a complementary tooth adapted to engage an inclined face of one of said series of teeth, the said engagement effecting a setting of said recording element by said load responsive element, the elongated faces of said teeth producing a multiplication of the unit increment of movement of said load responsive element, and recording mechanism controlled by the setting of said recording element for making a record of the units reading.

9. Weighing apparatus of the character described comprising in combination a scale having units recording means including a movable load responsive element adapted to be moved to a position representing the weight of the load and a cooperating recording element movable toward and away from said load responsive element adapted to be set by the position assumed by said load responsive element, one of said elements having a series of small beveled teeth, the length of the series corresponding in length to the path traversed by said load responsive device, said teeth each representing ten units and being long in relation to their pitch and having one face parallel to the direction of movement of said recording element, the other face being elongated and gently inclined to said direction of movement and its length representing ten units, the other element having a complementary tooth adapted to engage an inclined face of one of said series of teeth, the longitudinal movement of said recording element being arrested by engagement of the inclined faces of said teeth whereby the recording element is set in a position representing the units reading, the elongated faces of said teeth producing a multiplication of the unit increment of movement of said load responsive element, and recording mechanism controlled by the setting of said recording element for making a record of the units reading.

10. The method of accelerating equilibration in weighing loads which is characterized by applying an automatically counterbalancing force so as to provide a system which may freely oscillate with simple harmonic motion, holding the system against movement until after a load has been applied, releasing the system so as to allow it freely to commence oscillation, and repeatedly retarding any oscillation at the quarter period of the oscillation thereby bringing the system to rest in load balance position.

11. The method of accelerating equilibration in weighing which is characterized by counterbalancing a load in a system which oscillates with simple harmonic motion, the period of which is substantially fixed regardless of variations in the weight of the load, allowing the system to oscillate freely, and repeatedly arresting the oscillation of the system at approximately the quarter periods of oscillation thereby arresting the system at points successively closer to the balance point.

12. Weighing apparatus of the character described comprising in combination a scale having a light weight rotary load responsive indicator arranged to be rotated to a position representing the load, said indicator having a range of travel of substantially a single revolution, a series of step cams for recording the "units" and "tens"

digits in the weight of the load, said step cams being independent of said scale and adapted to be moved into contact with and to be set by the position of said indicator, said indicator having pairs of diametrically opposite setting fingers for each of said "units" and "tens" step cams, said step cams being semicircular in shape and embracing only half of the total range of movement of said indicator, said setting fingers being alternately operative to afford a full range of positions for said step cams, and means associated with said step cams for translating their set position into a record of the weight.

13. Weighing apparatus of the character described comprising in combination a rotary load responsive index having a range of travel in excess of 180° adapted to assume a position representing the weight of the load, a plurality of independent cylindrical step cams representing units and higher digits, spaced setting points carried by said index for setting the respective step cams, the units setting points being located at the greatest distance from the axis of rotation of said index, means for axially advancing said step cams respectively into engagement with the respective setting points on the index whereby said step cams are set in positions representing the weight of the load, and means for positively holding said load responsive index against deflection under the engaging force of said step cams.

14. Weighing apparatus of the character described comprising in combination a scale having a light weight rotary load responsive indicator having a range of travel in excess of 180° arranged to be rotated to a position representing the load, a series of step cams for recording the "units" and "tens" digits in the weight of the load, means for mounting said step cams to move in a straight line toward said indicator, means for moving said step cams into engagement with said indicator, said indicator having portions to be engaged by the respective step cams to set the same, means for positively holding said load responsive index against deflection when engaged by said step cams, and means associated with said step cams for translating their set position into a recorded weight.

15. Weighing apparatus of the character described comprising in combination a weight exhibiting device including a weight responsive member adapted to be moved to a position representing the weight of the load, an element for transmitting the force of the load to be weighed, said element and said load responsive member being movable in substantially parallel lines, a floating lever provided with curved surfaces at the ends thereof formed on arcs of relatively large radii having a common axis close to the center of gravity of said lever, flexible tapes connecting said lever to said element and to said load responsive device respectively and adapted to wind on and unwind from said respective arcs, said lever being provided with means including a curved surface coaxial with said arcs for causing said lever to roll in a straight line parallel to the line of movement of said load responsive member, said means being substantially closer to the connection of said element than to that of said load responsive member to effect a substantial multiplication of the movement of the latter compared with that of said element, and means connected to said lever for counterbalancing the pull of the load.

16. Weighing apparatus of the character described comprising in combination weight indicating means including a rotary indicator shaft, a longitudinally reciprocable member for rotating said shaft and mounted for reciprocation in a straight line, a load tension element reciprocable in a line having substantially a fixed angular relation to said line of reciprocation of said member, a floating lever between said tension element and said member and having its ends curved respectively on arcs to which said lines of reciprocation are tangent at all positions of oscillation of said lever, flexible connections connecting said lever with said tension element and said member respectively, said flexible connections being adapted to wind on and unwind from said curved ends as said lever oscillates, a supporting flexible connection connected to said lever at a point intermediate its ends for supporting said lever, said lever having a winding surface for said supporting connection curved on an arc to which said supporting connection is tangential at all positions of oscillation of said lever, whereby the movement of said reciprocable member is exactly proportional to that of said tension member at all positions of said lever.

17. Weighing apparatus of the character described comprising in combination a weight responsive member movable in a straight line to a position representing the weight of the load, a load transmitting element movable in a straight line parallel to that of said load responsive member, a rocking lever for transmitting movement for said element to said member and effecting a substantial multiplication of said movement proportional to the weight of the load, means connecting said lever to said member and element so that the latter is tangential in all positions to the respective lines of movement of said member and element, means for supporting said lever to cause it to roll along a line parallel to said lines of movement and engaging said lever at a point substantially close to the connection of said element thereto to effect a substantial multiplication of the movement of said member, and load counterbalancing means connected to said lever to allow movement of said load responsive member proportionally to the weight of the load to counterbalance the latter.

18. Weighing apparatus comprising in combination an automatic load counterbalancing system adapted to oscillate freely on both sides of its load balance position and having a period of oscillation not substantially longer than one second, means synchronized with the oscillation period of said system for applying a brake repeatedly for very short periods to said system as the system at approximately the quarter period of oscillation passes load balance position whereby to bring said system to rest quickly in load balance position, means operative after the system has come to rest to hold said brake applied for a substantially longer period, and recording mechanism for making a record of the weight of the load during the latter application of said brake.

19. Weighing apparatus comprising in combination a spring counterbalanced weighing system adapted to oscillate freely about load balance position and having a relatively short period of oscillation, a brake for arresting the oscillation of said system, means for repeatedly applying and releasing said brake, said means releasing said brake for a fraction of a second and applying the same at approximately the quarter period of oscillation when the system is closed to load balance position for an interval substantially less than the period of release of the brake whereby to bring said system quickly to rest in load balance position, said means thereafter holding said brake applied for an interval substantially longer than the aforesaid period, and weight recording mechanism operative during the latter interval of brake applications for recording the weight of the load.

20. Weighing apparatus comprising in combination a spring counterbalanced weighing system adapted to oscillate freely about load balance position and having a relatively short period of oscillation, a brake for arresting the oscillation of said system, means for repeatedly applying and releasing said brake, said means releasing said brake for a fraction of a second and applying the same at approximately the quarter period of oscillation when the system is close to load balance position for a period substantially less than the period of release of the brake to bring said system to rest quickly in load balance position, the total period of said applications and releases of said brake consuming less than two and one-half seconds, said means thereafter holding said brake applied for an interval substantially longer than the previous periods of brake application, and weight recording mechanism operative during the said longer interval of brake application for recording the weight of the load.

21. Weighing apparatus comprising in combination a spring counterbalanced weighing system wherein the live load is wholly offset by a spring capable of oscillating freely about load balance position, said system having low inertia so as to have a relatively short period of oscillation, a brake for arresting the oscillation of said system, means for repeatedly applying and releasing said brake, said means releasing said brake for a fraction of a second and applying the same at approximately the quarter period of oscillation when the system approximates load balance position for a period substantially less than the period of release of the brake whereby to bring said system quickly to rest in load balance position, said means thereafter holding said brake applied for an interval substantially longer than the previous period of brake application, and weight recording mechanism operative during the said longer period of brake application for recording the weight of the load.

OLIN H. BASQUIN.